METHOD AND APPARATUS FOR SORTING OF RECORDED DIGITAL DATA

Filed Feb. 2, 1960 5 Sheets-Sheet 1

INVENTOR.
Gerhard Dirks
BY
Michael S. Striker
Attorney

March 22, 1966 G. DIRKS 3,242,466

METHOD AND APPARATUS FOR SORTING OF RECORDED DIGITAL DATA

Filed Feb. 2, 1960 5 Sheets-Sheet 2

INVENTOR.

Gerland Dirks

BY

Michael S. Striker

Attorney

METHOD AND APPARATUS FOR SORTING OF RECORDED DIGITAL DATA

Filed Feb. 2, 1960 5 Sheets-Sheet 3

INVENTOR.
Gerhard Dirks
BY
Michael S. Striker
Attorney

INVENTOR.

Gerhard Dirks

BY

Michael S. Striker

Attorney

March 22, 1966 G. DIRKS 3,242,466

METHOD AND APPARATUS FOR SORTING OF RECORDED DIGITAL DATA

Filed Feb. 2, 1960 5 Sheets-Sheet 5

INVENTOR.

BY 3,242,466

METHOD AND APPARATUS FOR SORTING OF RECORDED DIGITAL DATA

Gerhard Dirks, 44 Morfelder Landstrasse, Frankfurt am Main, Germany

Filed Feb. 2, 1960, Ser. No. 6,304
Claims priority, application Great Britain, Feb. 2, 1959, 3,548/59
23 Claims. (Cl. 340—172.5)

The invention refers to a method and to an apparatus for sorting of recorded data-word-groups.

At the usual sorting of punched cards a separate record card is provided for each data-word-group of an information, of which such word-groups are to be sorted in ascending or descending order on behalf of sorting data, so that at the sorting of such record cards a local coordination of the record-cards will be effected. This takes place in a series of steps which effect for each record card the coordination at each step in dependence on sorting data (sorting word), which are included within the information data, and are recorded in a selectable column (data position) on the record card. The number of the sorting steps is equal to the number of data positions within the sorting data of the data-word-groups, and each data-record-card must be processed at each such step.

Comparable methods have been used for the sorting of data-word-groups which had been recorded on other data carriers, for instance perforated tapes or magnetic tapes. The sorting is effected in such a way that the data-word-groups are selectively transferred from one record-means to another, as a local new arrangement of the data carriers is not possible. For instance, one tape is provided for the input of data and ten tapes are provided for a selective transfer of data-word-groups. Each one data-word-group is sensed from the input tape, and the value of the data in the selected sorting positions will be determined controlling into which of the transferred tapes the data-word-group to which the sorting-word is to be recorded. When all the data-word-groups have been sensed and have been distributed to the tapes for a selected transfer, these tapes are used successively for forming a new input tape in this succession for the next sorting step. This process is repeated for each data position which controls the sorting process and is repeated in a manner which is similar to the sorting process of punched cards.

In the sorting method mentioned above, each data-word-group has to be processed at each step of sorting, that is, it is to be processed as often as there are sorting-data positions required for the control of the sorting. Furthermore, each sorting-step must be completely terminated before the next step can be started. As a result of these two factors, this sorting method is relatively slow and requires a long time compared with the speed with which electronic computers may process data, if the data-word-groups are once in the sorted order.

It is the object of the invention to provide an improved arrangement for sorting data items (data-words) in a series of steps, different operations being carried out on at least two of the sets and the operations being such that two or more of the steps may be carried on concurrently.

The invention consists of a method for the sorting of a data-word-group recorded on an original record-means, e.g. magnetic tape in a random sequence, which are transferred from this original record means to $n$ ($n$=2, 3 . . .) record-means in such a manner that the first $(n+1)^{th}$, $(2n+1)^{th}$, etc., data-word-group will be transferred to the first record-means, the second $(n+2)^{th}$, $(2n+2)^{th}$, etc., data-word-group to the second record-means, the $n^{th}$, $(2n)^{th}$, $(3n)^{th}$, etc., data-word-group to the $n^{th}$ record means. At each time the sorting-words which are coordinated to the data-word-groups are compared with each other and the smallest value of these sorting-words is selected in close comparing these words. In dependence on this selection, the coordinated data-word-group which may include the sorting-word is recorded within a record-means in ascending or descending order with respect to the coordinating sorting-words for a group-length which corresponds to the number of data-word-groups recorded in such sequence and is equal to the number "$n^a$," wherein "$n$" represents the number of record-means (tapes), and "$a$" represents a number of sorting tape-passages. The tape from which the transfer was effected, based upon the selection of the smallest or largest sorting value, is advanced by one data-word-group, as far as the respective group-length on this record-means has not yet been reached within the sorting steps. Finally, by combination of selected transfers controlled by the comparison of the sorting-words, the group-length at this transfer of data-word-groups is increased at each tape-passage to "$n^a$" data-word-groups at each tape-passage.

According to the invention, a device for sorting digital data recorded in a random sequence on a record means for carrying out the method above mentioned comprises a comparing means for comparing the sorting words associated with the first data-word-groups on each tape with one another, determining the smallest value for these sorting words in close comparison, and recording this value in dependence on the associated data-word-groups on a tape in descending or ascending sequence of said associated data-word-groups on this tape. A transport control means transports the tape from which the transfer, on account of the selection of the highest or the lowest sorting-word, will follow by a data-word-group. A control means is actuated on reaching the end of the group-length on this tape within these sorting-steps and moves this tape no further until the corresponding group-lengths from the other tapes are completely transferred, the next cycle being started after completely finishing this transfer. Group-length determining means increase on each passage the number of the data-word-groups within one group to a group-length of $n^a$ data-word-groups, wherein "$n$" is the number of tapes and "$a$" is the number of sorting tape passages.

In accordance with another embodiment of the invention, the sorting device comprises a first store adapted to store a number of groups of data items (data-words), each of which groups contain a plurality of data-items, means adapted to transfer the data items from the input device to a specified sequence of storage positions in the first store, a second store, comparing means adapted to compare the sorting indicators of the data items of at least two of said groups, signal transfer means operable under control of the comparing means and adapted to enter the data items of said two or more groups into the second store to form a larger group of data items in ordered sequence, a third store, and second signal transfer means adapted to selectively enter items from the second store into the third store to form another group therein, consisting of the data items of at least two of such larger groups merged into a single group in ordered sequence.

In order that the invention may be readily carried into effect, it will now be described with reference to the accompanying drawings, wherein:

FIGS. 1*a* to 1*e* show number diagrams of the timed sequence of the sorting process;

FIGS. 3 and 4 together comprising said schematic block diagram.

Figure 3:
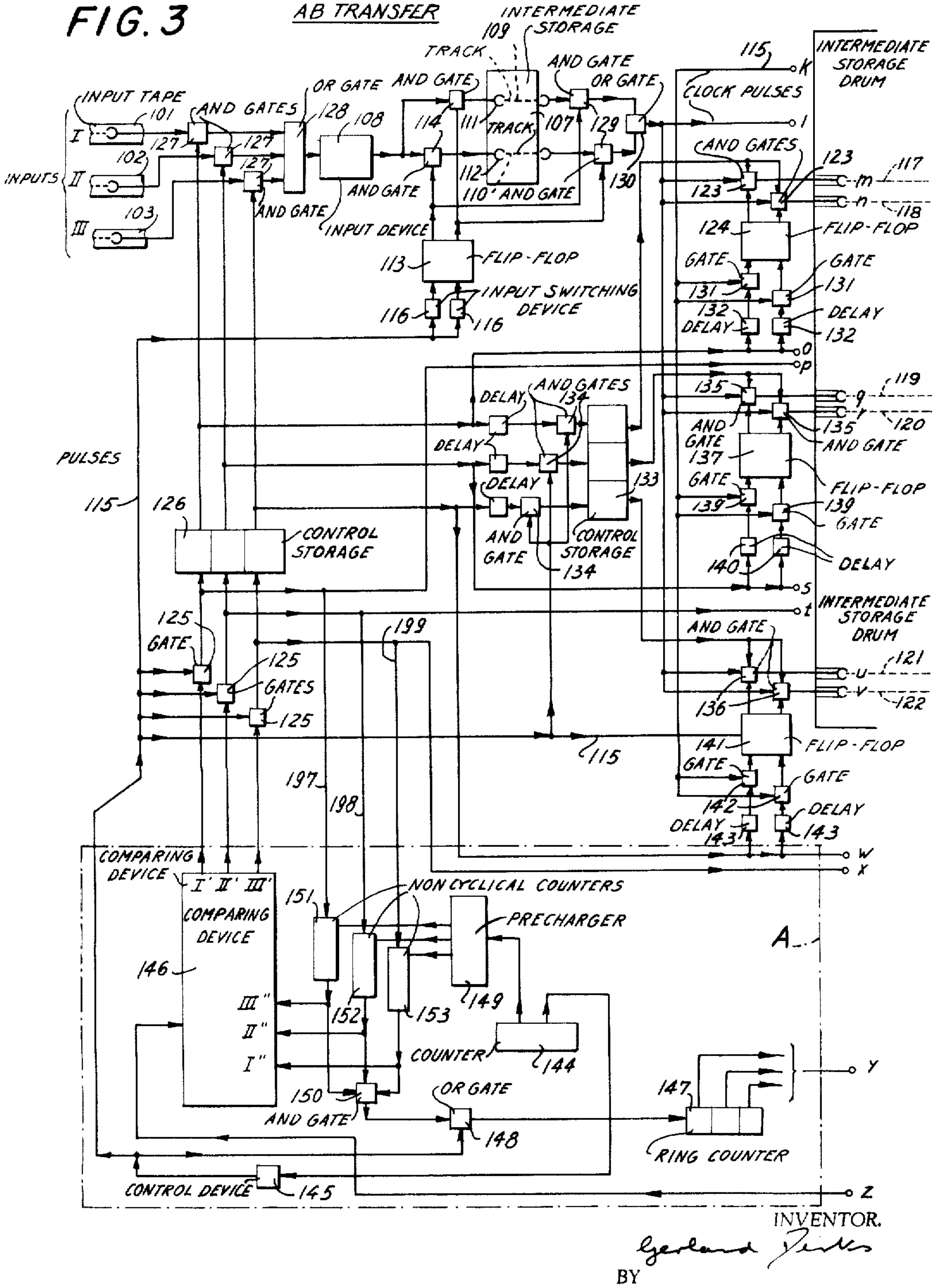
FIGS. 3 and 4 are a schematic block diagram of the sorting device of the present invention in greater detail for a tape sorting with two times three tapes.
Figure 4:
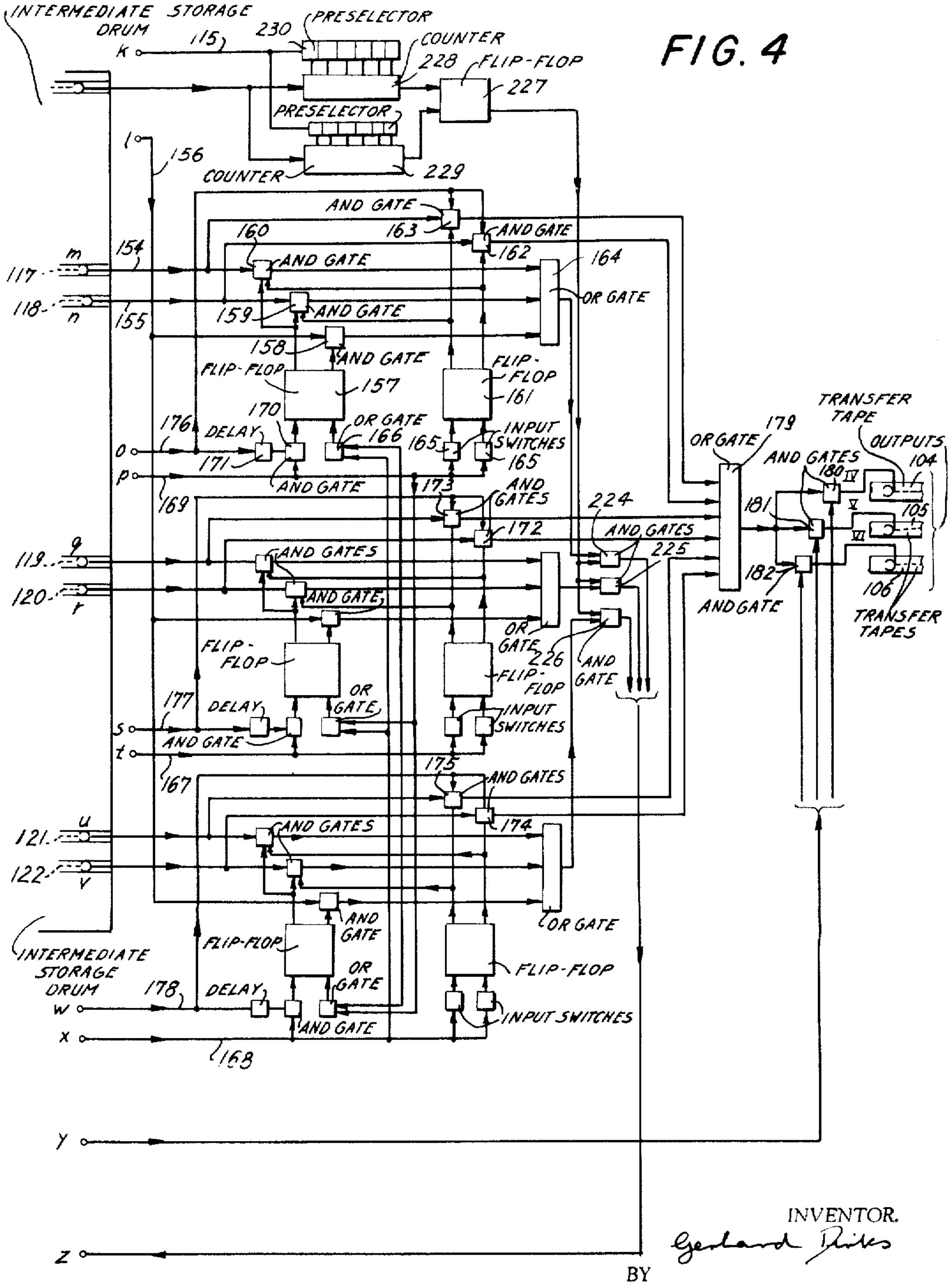
Figure 5:
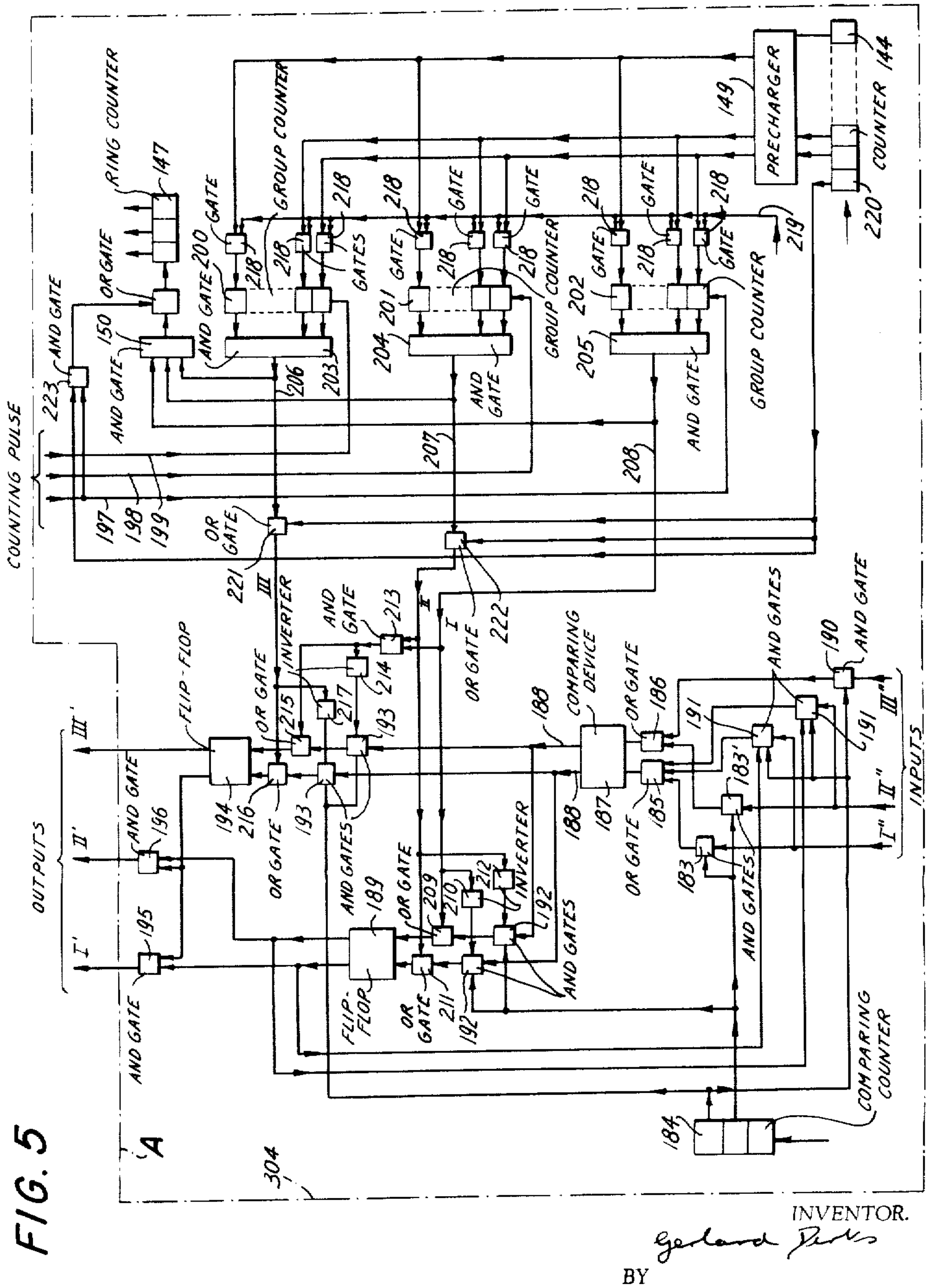
Figure 6:
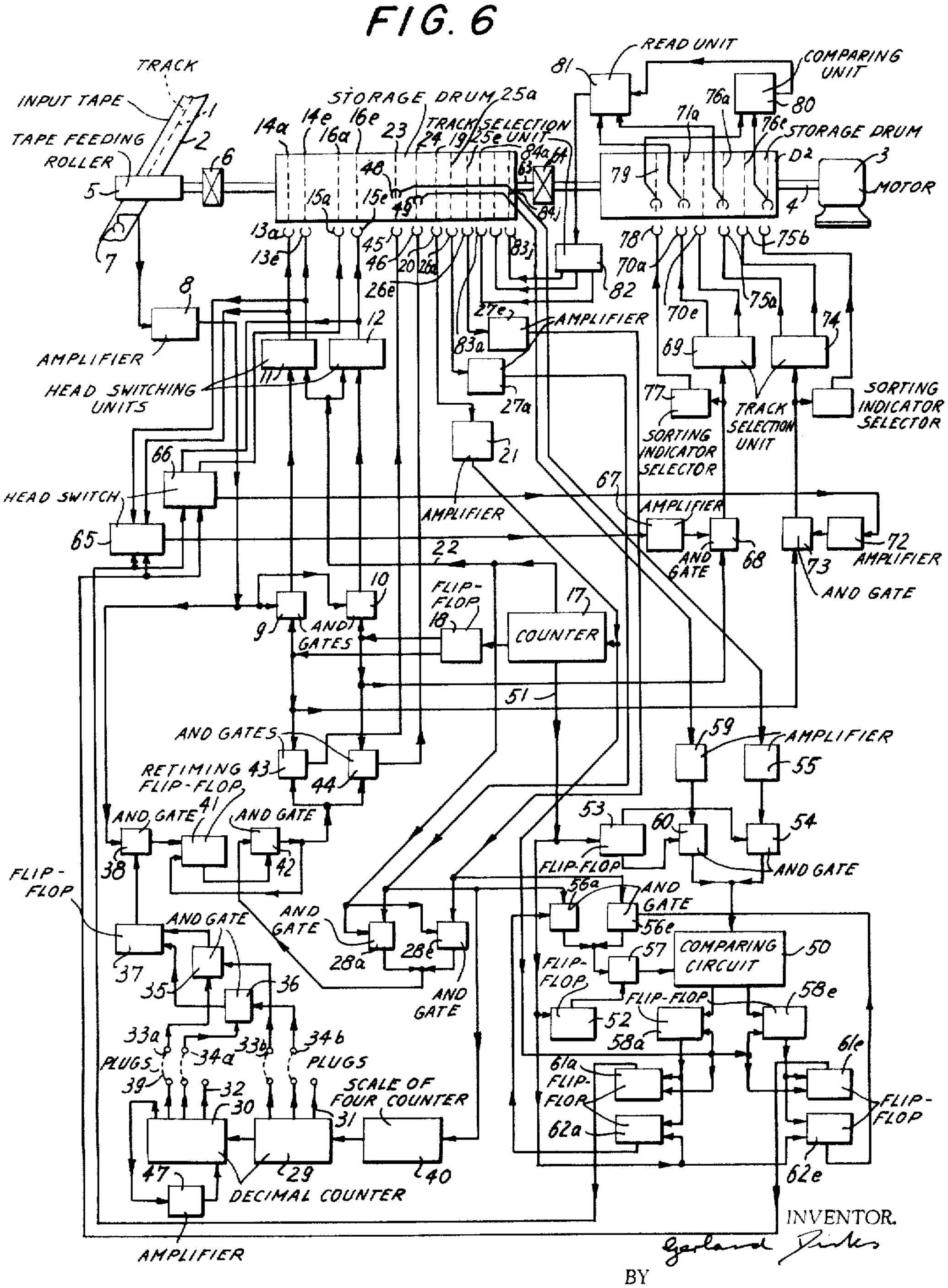

The points of connection of the diagram of FIGS. 3 and 4 are identified with the same reference characters;

FIG. 5 is a schematic block diagram of the portion A of the diagram of FIG. 3 in greater detail and includes the tape transport control device in detail; and FIG.6 is a schematic block diagram of another embodiment of the sorting device of the present invention in which sorting takes place through rotatable magnetic storages in groups of each five data-word-groups, which increase at each passage of information series by one power series based upon number 5, i.e. at the first tape passage in groups of each five data-word-groups, at the second passage in $5^2$=groups of 25 data-word-groups, at the third tape passage in $5^3$=groups of 125 data-word-groups at the fourth tape passage in $5^4$=groups of 625 data-word-groups.

Figures 1A, 2:
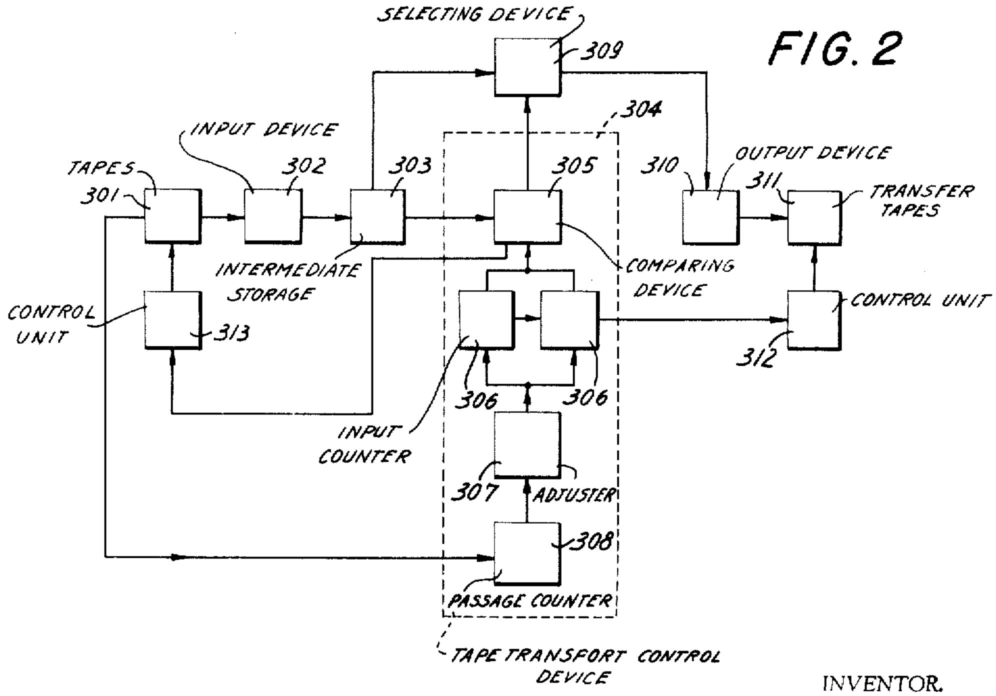
FIG. 2 is a schematic block diagram of an embodiment of the sorting device of the present invention.

FIG. 1*a* shows in an example of numbers, how sorting takes place with e.g. two times three tapes, in which at each passage of tapes the length of groups within the data information are made up of data-word-groups sorted in an ascending order of the sorting data (sorting-word) included within the data-word-groups of information data. The lengths of groups increase the number of included, sorted data-word-groups according to a power sequence of 3 ($3^1$, $3^2$, $3^3$ groups, etc.). A random sequence of sorting data is included in information data (information data not shown) represented on a magnetic data record-means and such informations are to be sorted according to the sorting data in an ascending order of such data.

As a first step, there takes place according to FIG. 1*b* a transfer of the information data on behalf of the sorting data of the first tape, that is transfer from the input tape 101 to three transfer tapes 104, 105 and 106 takes place by an alternating and successive transfer through the corresponding magnetic heads on such tapes. The tape-passage may be called the "zero-tape-passage." For example, each first, fourth, seventh, and so on, data-word-group (which in a punched card process would correspond to the group of information contained in a record card) will be transferred to the tape 104, each second, fifth, eighth, and so on, data-word-group will be transferred to tape 105, and each third, sixth, ninth, and so on, data-word-group to tape 106. FIG. 1*b* shows the respective sorting data included in such information data.

During the next tape-passage (the so called first tape sorting passage), the tapes 104, 105, 106 used above for receiving transferred data are used as input tapes for the data input I, II, III of the sorting device and the transfer takes place through the outputs IV, V, VI to the tapes 101, 102, 103 of the sorting device.

Then the first tape sorting passage takes place. In the first passage the transfer of data-word-groups to the transfer tapes does not change with each data-word-group but in group-lengths of each three data-word-groups.

The sorting takes place according to the following scheme: Each first data-word-group of three tapes is now introduced into a comparing device, in which for a group of sorting data positions (sorting-words) the sequence of such sorting-words is determined in ascending (or descending) sequence. The three coordinated data-word-groups are then recorded in this ascending sequence of the sorting-words through the outputs IV, V, and VI successively on tape 101. Then, at each time the sorting-words of the second data-word-groups of the three tapes are compared, and again there are recorded the coordinated data-word-groups in dependence on ascending sequence of the sorting words in tape 102. Then each third data-word-groups follow on the tapes, such data-word-groups being transferred to tape 103 in an ascending sequence according to their coordinated sorting-words. Each fourth data-word-groups of tapes 104, 105 and 106 are again recorded in a sorted manner to tape 101, so that then a sorting has been performed on the tapes 101, 102, 103 for the data-word-groups in group-lengths of each three data-word-groups, so that on each of the tapes 101, 102, 103 a sorting has been performed respectively in dependence on the coordinated sorting-words.

Now the second tape passage (sorting step) takes place in which the sorting into group length of each nine data-word-groups ($3^3$=9 data-word-group-lengths) is to be achieved. The tapes 101, 102, 103 used as transfer tapes are transferred to an input I, II, III as to an input I, II, III of the sorting apparatus and the tapes 104, 105 and 106 are used as transfer tapes.

The single sorting steps take place in the following way:

At first there are to be compared again the sorting words of the first data-word-groups of the three tapes, for instance the sorting-words as numbers 04, 03, 02 of FIG. 1*a*. As the smallest value of these sorting words there is in this example determined by the comparing device the sorting word 02 and the respective data-word-group including this sorting word will be recorded on tape 104. There is now used for the comparison instead of the recorded sorting-word 02 the next sorting-word of this tape, namely the sorting-word 31 of the next data-word-group. The just transferred data-word-group which includes the sorting-word 02 is coordinated in advancing the respective tape by one data-word-group, so that the comparing device receives for the purpose of comparison the sorting-words 04, 03 and 31. 03 will be selected as the smallest sorting-word, and the coordinated data-word-group is recorded through IV. Correspondingly, the tape sensed through input II is advanced by one data-word-group, so that the data-word-groups with the sorting-words 04, 05, 31 are in an operative position for the comparison. The sorting word 04 is then selected as smallest sorting-word, and through output IV the coordinated data-word-group is recorded. Tape 101 is advanced by one data-word-group, so that the sorting-words 14, 05, 31 are then compared. The sorting-word 05 of tape 102 is recognized as the smallest sorting-word and the coordinated data-word-group is transferred through output IV to tape 104. At input II the tape 105 is advanced by one data-word-group, and it brings the sorting-word 13 into the comparing device, which selects from the sorting-words 14, 13, 31 the sorting-word 13 as the smallest one, and records the respective coordinated data-word-group through output IV. Tape 105 at input II is advanced again by one data-word-group. But, after sorting of the group-length of three data-word-groups has been completed on this tape, the next sorting-word of the data-word-group of this tape is no longer introduced into the comparing device, but only the sorting-words of the two other tapes are introduced, at inputs I and III, so that the sorting-words 14 and 31 are then compared one to the other. Sorting-word 13 will again be determined as the smallest sorting-word within the coordinated data-word-groups through output IV. The tape at input I is advanced by one data-word-group and it brings the sorting-words 15 and 49 of the data-word-groups into the comparing device, which selects the coordinated data-word-group of sorting-word 15 for recording and starts the advance of the tape 104 at input I. The group-length of three data-word-groups is thereby also sorted in tape 101, and the remainder, namely the data-word-group containing the sorting-words 31, 49 of the group-length of three data-word-groups, is then transferred from tape 106 at input III to output IV.

Each first group-length of three data-word-groups are thereby combined to a group-length of nine ($3^2$) data-word-groups on tape 4 in a sorted ascending sequence. Then, in the same way, the sorting of each second group-length of three data-word-groups of the tapes 104, 105, 106 takes place, but this transfer is effected through output V; correspondingly, each third group-length of the tapes 101, 102 and 103 is sorted in ascending order into group-length of each nine data-word-groups to the tape 106 through the output VI. The sorting of each fourth group-length of data-word-groups of the three tapes 101, 102 and 103 would again take place through the output IV to tape 104, so that in this sorting process the desired sortings are accepted in group-lengths of each nine data-word-groups.

The next sorting step will supply, by the sorting of group-lengths of each nine data-word-groups from three tapes, a group-length of 27 data-word-groups in ascending order of their sorting-words as shown in FIG. 1*e*. For the number of data-word-groups and respective sorting-words of this example a final sorting has been achieved. The sorting itself takes place in the same way as in the preceding tape passages (sorting-steps).

With three sorting step tape passages (in this counting of tape passages the preparatory "zero-tape-passage" mentioned above is not counted) there may be effected in this manner a sorting of data-word-groups into group-lengths of $3^3=27$ data-word-groups. With four such tape passages a sorting into group-lengths of $3^4=81$ data-word-groups. With five such tape passages a sorting into group-lengths of $3^5=243$ data-word-groups, etc. At first glance, it seems that this sorting process would not result in a considerable increase of sorted output-data compared with presently known sorting processes, as during the first sorting steps the group-length increases very slowly in the first powers of "$n$." If, on the other hand, the increase between the fifth, sixth, tenth and fifteenth and of higher powers are taken into consideration, it is evident that the efficiency of this sorting method is very considerable and that it is especially valuable for sorting purposes with a high sorting output of a greater number of data-word-groups. In the sorting method and means described above, a tape transporting step takes place at each comparison of sorting-words. To increase the operating speed, it is possible to store a large number of information in an intermediate storage (e.g. tracks of a drum), to make the respective comparison and stepwise transfers step by step on the drum, and to transfer the result of such grouping within one movement of a stepwisely moved transfer tape. In the same manner, the other transfers within the sorting processes may also be effected, so that only a relatively low number of switchings of the tape transport is required and only a relatively slow speed as to the mechanism of the stopping device is required for high sorting speeds. Such stepwise transfers into and between intermediate storages, e.g. in rotatable magnetic storages, may be effected either by an electronic switching of stationary heads, a mechanical shifting of such stepwisely shifted heads, or a stepwise movement of the signal carrier against such rotating heads.

FIG. 2 shows a block-diagram of the sorting apparatus, shown in detail in FIGS. 3 and 4. The sorting process is primarily as follows. The input takes place through tapes 301, from where the data-word-groups may be transferred to an input device 302, which may be for example an input device for signals arriving sychronously at the intermediate storage, as disclosed in copending United States patent application, Serial No. 848,078, filed October 22, 1959, now Patent No. 3,037,-194 dated May 29, 1962. The data is fed through intermediate storage 303, which may be for instance a magnetic drum, to the tapes and to the tape transport and to the tape transport control device 304. The tape transport control device 304 effects the control for the record and the transport of the input tapes, and also the switching over of the transfers and the transport of the transfer tapes, and determines from which intermediate storage the data-word-groups are to be selected for such transfer. The tape transport control device 304 effects the stepwise movement and therefore the input from the three inputs of data-word-groups for the determination of the lowest sorting-word as long as the tape has remaining lengths of data-word-groups which are still to be sorted within the operative group. The data-word-groups belonging to the group-lengths of the respective tape passage are counted by the input counter 306. When a full group-length of such data-word-groups is completely sensed from the three tapes, the cyclic counter 147 (FIG. 3) is advanced by one step, and the next transfer tape is prepared for the stepwise transport for the next data-word-group. Each new adjustment of the input counter 306 is accomplished by the adjusting means 307 in dependence on the passage counter 308. The data-word-groups to be transferred are taken from the intermediate storage by the selecting device 309 and are conducted through the output device 310 to the transfer tapes 311. The selecting device 309 is controlled by the comparing device 305. In order to avoid too rapid start and stop movements of the stepwisely operated tapes, intermediate storage areas may be provided for each tape. The intermediate storage areas collect a greater number of data-word-groups, which are then transferred to such tapes in one step of movement thereof.

A detailed arrangement for such a sorting process, according to the sorting of the numbers of FIG. 1*a*, is illustrated in FIGS. 3 and 4 for a two by three (six) tape sorting apparatus and is now described in more detail.

FIG. 3 shows the transfer of data-word-groups from the tape through the inputs I, II and III into the intermediate storage 107, which may be, for example, a magnetic drum. The transfer of the data-word-group from the tape takes place in dependence on the position of outputs I', II', III' of the comparing device 146 of which only one output becomes effective at each time, determining thereby the smallest sorting value of a sorting word. The determination of the comparing device 146 is transferred through gates 125 into a control storage 126, e.g., in the form of three flip-flops, which control the transfer from the tape through the inputs I, II, III, through the AND gates 127 and the OR gate 128. The tapes need not be sensed synchronously with the rotation of the drum 107. They may be positioned on the drum in the correct position through a device 108.

The drum 107 includes two recording heads 111 and 112 for the correct recording on tracks 109 and 110 of the data arriving from the tapes. The tracks are electrically connected to the input device 108 alternately by means of the flip-flop 113 and the AND gates 114. The flip-flop 113 is controlled by pulses 115 through the input switching device 116 alternatively at each new information. The flip-flop 113 also controls the AND gate 129 and the OR gate 130 as well as the alternating transfer from the tracks 109 and 110. The data-word-group recorded in the tracks 109 and 110 are transferred after this recording instantly into the intermediate storage tracks 117, 118, 119, 120, 121 and 122, whereby the tracks 109 and 110 will alternately be free for the recording of new data-word-groups. The transfer to the intermediate storage tracks 117 to 122 takes place in such a way that data-word-groups arriving from input I are transferred to the intermediate storage tracks 117 and 118, data-word-groups arriving from input II are recorded in the intermediate storage tracks 119 and 120 and data-word-groups arriving from input III are transferred to the intermediate storage tracks 121 and 122. The recording within these pairs of tracks takes place alternatively in track 117 or 118, 119 or 120, 121 or 122. The changing is controlled, for example, by informations from input I through the AND gates 123 and flip-flop 124. The setting of flip-flop 124 takes place by the sorting clock-pulses 115 which switch over the flip-flop 124 alternatively through the gates 131. The gates 131 are controlled through the control storage 126, and this control takes place through delay means 132. Thus, the change of the flip-flop 124 takes place only if a data-word-group enters from tape 101 to the input tracks 109 and 110 and is sensed again for a transfer to track 117 or 118. The control storage 133 receives from the control storage 126 the result from the output of the comparing device 146 through the delayed controlled AND gates 134 and determines by its output, which controls the AND gates 123, 135 and 136 (in dependence on the sorting groups included in the data-word-groups) to which of the tracks 117, 118, 119, 120, 121 and 122 the respective data-word-group is to be transferred. Thus, data-word-groups arriving from input I are transferred to the first-named pair of tracks; data-word-groups arriving from input II are transferred to the second-named pair of tracks, and data-word-groups arriving from input III are transferred to the third-named pair of tracks. The control of the gate arrangements 135, 137, 139, 140 and 136, 141, 142, 143 corresponds respectively to that of 123, 124, 131, 132.

For each passage (sorting step) counter 144 is advanced by one step. The step counter 144 is, for example, initially in its zero position, and controls, in the zero position, through the control device 145, the comparing device 146 in such a way that only output I′ of said comparing device is effective. Therefore, only input I sensing the tape 101 is operative and cyclic clock pulses 115 are passed through the OR gate 148. The outputs IV, V and VI are thus made effective, switching successively after each other after each data-word-group. The sorting-step (tape-passage) counter 144 effects at the beginning of each of the sorting steps in the positions following its zero-position, through the precharging means 149, the precharging of three non-cyclically operative counters 151, 152, 153. Each of the counters 151, 152 and 153 is adjusted in such a way that at the end of the sorting steps group-lengths of $3^n$ data-word-groups are counted thereby. The counters 151, 152 and 153 receive their pulses in dependence upon the result of the comparing by the comparing device 146 through each clock pulse 115 which controls the gates 125. The output pulse switches the comparing device 146 after $3^n$ data-word-groups in a manner whereby the value coordinated to the respective counter is not taken into consideration in the comparison.

If all three counters 151, 152 and 153 have reached their last position, they effect through the AND gate 150 and the OR gate 148 a step-advance of the cyclic counter 147 shown in FIG. 3 which switches on the next transfer tape.

FIG. 4 shows the manner in which the data-word-groups are recorded into the intermediate storage areas and are introduced into the inputs I″, II″, III″ of the comparing device and the manner in which these data-word-groups are selected for transfer through the outputs IV, V and VI in dependence upon their coordinated sorting words, and they are distributed correspondingly.

Only the information circuits coordinated to the input I are considered, since the other two information circuits operate in the same manner. The data-word-group which is to be fed into the input I″ of the comparing device 146 is contained either in tracks 117 or 118 or tracks 109 or 110 of the drum 107. Whether the track 109 or 110 is to be selected is determined by the flip-flop 113 and the gates 129 by the regularly alternating input to the tracks, so that there need only be made a selection between the leads 154 and 155 from the reading heads and the lead 156 through which the data-word-groups mentioned above are transferred. The flip-flop 157 selects through the AND gates 158, 159, 160 one of the leads 156, 154 and 155. The flip-flop 161 selects through the AND gates 159 and 160 one of the leads 154 and 155. The leads join in OR gate 164 and are introduced from there to the input I″ of the comparing device 146. The switching over of the flip-flop 161 takes place in an alternating manner through the input switching means 165 at each time that the sorting-word arriving from the tape 101 is the smallest, whereby lead 169 receives a pulse. The flip-flop 157 is operated through the OR gate 166 which prepares leads 154, 155 when a sorting-word arriving from tape 102 or tape 103 (FIG. 3) is the smaller one, whereby a pulse occurs in the leads 167 and 168. The flip-flop 157 switches on the lead 156 through the AND gate 158. The lead 169 has a pulse (i.e. if input I shows the smallest value). This pulse can only be effective through the AND gate 170. The gate 170 allows an effectiveness of the pulse arriving from lead 169 through the delay 171 only if the control storage 126 of FIG. 3 is at the sensing of the comparing device output I′ or has been energized to indicate the preceding word coordinated to the data-word-group as smallest, i.e. that the sorting-word 01 was the smallest for the second time.

Before the data-word-groups which are to be delivered to the inputs I″, II″, III″ of the comparing device 146 enter these inputs they have to pass the AND gates 224, 225 and 226. The AND gates 224, 225 and 226 select only those sorting data (sorting-words) of the total information-content, of the data-word-groups contained in the intermediate storages, which are to be used for the comparison, and this selection is effected by making said gates conductive only for determined time periods during the passing of the signals for the data-word-group, such periods referring to the passing of those signals representing the sorting-word. The output of the flip-flop 227 is made effective by a counter 228 and is made ineffective by a counter 229. These two counters are preadjusted by the preselecting means 230 which determine the position of the beginning and the end of the sorting word within the data-word-group C for example, the 15th position from the beginning of the data-word-group is the beginning of the sorting-word, the 23rd position from the beginning of the data-word-group is the end of the sorting-word and this selection is controlled by entering the respective numbers into these counters at the beginning of each comparing process, which beginning is characterized by a pulse to the lead. The counters are advanced by a signal selected from the drum, which corresponds to the recording of the single data position of the data-word-group.

The data-word-groups which are to be delivered to the outputs IV, V, VI are to be taken from those tracks 117 or 118, 119 or 120, 121 or 122 of the intermediate storage which are characterized by the control storage 126 (FIG. 3). The selection takes place through the AND gates 162, 163; 172, 173; 174, 175 through the leads 176, 177 or 178. Which track of a pair of tracks is to be selected is determined, for example, by informations coordinated to input I by the flip-flop 161 and the AND gates 162 and 163. The process is the same for the data-word-groups coordinated to the other two inputs. The information circuits which are to be selected for the transfer are combined in the OR gate 179 and are distributed through the AND gates 180, 181, 182 to the three outputs IV, V, VI under control of the ring-counter 147. The ring-counter 147 switches the cycle for the next tape at a pulse delivered from AND gate 150, when the number of data-word-groups coordinated to the respective tape passage has been recorded, the tape being advanced, respectively, at the input after each data-word-group.

In the following, the comparison of the sorting-words is performed in the manner of a serial comparison of said sorting-words such that at first the first and the second sorting-words are compared with each other and from such comparison the smallest value of these sorting-words is determined. Afterwards, the third sorting-word is compared with the selected smallest sorting-word resulting from the comparison of the first and second sorting-word. The tape control unit is to advance that tape by one step in the length of a data-word-group, of which the smallest sorting-word, determined by the said comparison, had been recorded, but only if the number of the data-word-groups to be sorted within a group length of data-word-groups coordinated to the respective tape passage, is not then completely sensed. If a tape has reached the end of the group-length of a data-word-group effective during this tape-passage, it is advanced until the transfer of the other data-word-groups contained on the other tapes have been completed, as far as they fulfill this condition of the group-length. Only after the complete termination of the transfers of data-word-groups within this group-length on all the tapes, the corresponding tape is advanced again as described above, beginning a new cycle of sorting for a new group length. Furthermore, the tape transport is switched over to another tape if all three tapes have delivered $n^a$ data-word-groups, wherein "$n$" indicates the number of tapes (in this example, 3) and "$a$" indicates the number of tape sorting passages corresponding to the number of tape-passages. The sorting-words which are to be compared are delivered to the tape transport control device 304 through the inputs I', II', IIII'. The comparison is made in two steps.

As shown in FIG. 5, the comparing steps are counted by the comparing counter 184. In the first comparing step, the sorting words arrive through the AND gates 183 and 183' from the inputs I'', II'' of the comparing device 187 through the OR gates 185 and 186. The comparing device 187 may, for example, be represented by a known subtraction device or by known comparing circuitry. The result of the comparison is delivered at first through the outputs 188 of the comparing device 187 to the flip-flop 189 and stored there. In the second comparing step, the input III'' is released through the comparing counter 184 and through the AND gate 190 to the comparing device 187. AND gates 191 are also prepared. In dependence upon the position of the flip-flop 189, the input I'' or II'' of the AND gates 191 is selected and indicated to the other input of the comparing device 187 through OR gate 185. The output of the comparing device 187 is connected, in the second step of comparison, by the non-conductivity of the gates 192 and the conductivity of the gates 193, at first to flip-flop 194 and is stored there. Flip-flop 189 then contains the information, resulting from the first comparison, which of the sorting words from I'' and from II'' was the smaller, and flip-flop 194 represents whether the first found smaller sorting-word is smaller than the sorting-word introduced in the second comparing step through III'' or not. The outputs of the flip-flops 189 and 194 are connected through the AND gates 195 and 196 to the outputs I', II', III' of the tape transport control device 304. That one of the outputs I', II' and III' then becomes effective which is coordinated with the smallest sorting-word. At each transport, a counting pulse is delivered through the leads 197, 198 and 199 to the input group counters 200, 201, 202, which are coordinated to the single tapes. The leads 206, 207 and 208 become effective through the AND gates 203, 204, and 205 when the coordinated counter has arrived at the position determined by the gates, for example the final position, i.e. when a determined number of data-word-groups are sensed from one tape. When the lead 208 becomes conductive, the flip-flop 189 is adjusted through the OR gate 209 in connection with the inverter 210 and the AND gate 192 in such a way that only that output of said flip-flop becomes effective which is coordinated to the output II'.

Correspondingly, the flip-flop 189 is adjusted in such a manner that only that flip-flop output coordinated to the output I' may be made effective through the OR gate 211 and the inverter 212. If both leads 207 and 208 become effective, then the flip-flop 194 is adjusted through the AND gate 213, inverter 214, AND gate 193 and OR gate 215 in such a way, that only the output of flip-flop 194 coordinated to the output III' may become effective. If, finally, the tape 3 has been advanced in accordance with the number of steps within one group-length of data-word-groups in dependence on the respective tape-passage, then, through lead 206, the flip-flop 194 is adjusted through OR gate 216, inverter 217 and AND gate 193 in such a manner that only one of the two outputs I' and II'' may become effective. If, finally, all three non-cyclical counters 200, 201 and 202 are in their final stages, then the cyclically operative ring counter 147 is advanced by one step through AND gate 150 and releases the next tape for further advance.

After a tape passage, the passage-counter 144 is advanced by one step. The gates 218 are prepared through the precharger 149 and by means of a pulse delivered to the lead 219 and the counters 200, 201 and 202 are adjusted through the matrix or mesh and the positions of the counter 144. The input into the counter 144 may be in parallel and the complement of the number which has to be brought in may be fed to said counter. The aforementioned complement is understood to be the complement to the capacity of said counter. The values which are to be entered, advance, for example, in powers of three, as described above. At the zero passage, the data-word-group recorded on a single tape is distributed accordingly to three tapes. The tape-passage-counter 144 is then in its zero-position 220 and is effective through the OR gates 221 and 222 thereby making the leads 206 and 207 effective. Thus, as described, only the tape 101 is released for further advance. The lead 197 coordinated to the input I is connected through the AND gate 223 to the output group counter 147, so that the transport of the transfer-tapes changes at each input-step. When the first input-tape has been passed through, the passage counter 144 is advanced to its next stage and therefore effectuates the aforedescribed processes.

In another embodiment of the present invention, illustrated by FIG. 6, the sorting takes place in group-lengths of data-word-groups with an increase of the group-length according to a power sequence of five for each tape-passage. At first, group-lengths of five data-word-groups are formed and these data-word-groups are transferred within the effective group-length of data-word-groups in ascending sequence. This is followed by longer group-lengths of data-word-groups in group-lengths according to powers of five, and the data-word-groups are sorted in a corresponding manner until all the data-word-groups to be sorted are recorded on a single tape, etc.

The sorting takes place through storage drums as record means, in which stepwise track switching is provided, which track switching takes place at high sorting speeds.

The data-items to be sorted are recorded as signals in track 1 of an input magnetic tape 2. Two magnetic storage drums D1 and D2 are utilized for storing the data items during the sorting operation. The drums D1 and D2 and the magnetic tape 2 are driven in synchronism. The driving arrangements are illustrated schematically by a motor 3, which drives a shaft 4 carrying the drum D2. The shaft 4 drives a shaft 63, which carries the drum D1, through a gear box 64. The shaft 63 drives a tape feeding roller 5 through another gear box 6. Each of the magnetic storage drums D1 and D2 is provided with a plurality of data storage tracks. Each storage track of the drum D1 is large enough to hold one complete data item and each storage track of the drum D2 holds five data items. The ratio of the gear box 64 is 5:1, so that the drum D1 rotates at five times the speed of the drum D2. The ratio of the gear box 6 is so chosen in relation to the diameter of the tape feeding roller 5 that the tape 1 is fed for a distance equal to that between the start of the recording of one data item and the start of the next data item during one revolution of the drum D1. It will be assumed that each data item has eighty character positions, that is, it is equivalent in content to the information on one eighty column punched card. The data item may consist of several different information fields, such as man number, department number, rate of pay, etc., but each item is transferred as a unit during the sorting process.

The signals recorded in the track 1 are sensed by a magnetic head 7 as the tape 2 is fed by the roller 5. The head 7 is connected to the input of an amplifier 8, the output of which is applied in common to two AND gates 9 and 10. The output signals from the two AND gates 9 and 10 are connected to two five-position head switching units 11 and 12, respectively. The head switching unit 11 feeds five heads 13*a* to 13*e* which record in tracks 14*a* to 14*e*, respectively, of the drum D1. Similarly, the head switching unit 12 feeds five heads 15*a* to 15*e* which record in tracks 16*a* to 16*e*, respectively. In each case, for the sake of clarity, only two of each group of five heads is shown in the FIG. 6. The AND gates 9 and 10 and the two head switching units 11 and 12 are controlled, in a manner to be explained, in such a way that signals from the head 7 are fed to the heads 13*a* to 13*e* and 15*a* to 15*e* in a cyclic sequence. Thus, at the start of a cycle the AND gate 9 is open and the AND gate 10 is closed, so that signals from the head 7 are fed through the amplifier 8 and the AND gate 9 to the head switching unit 11. The head switching unit 11 is so set that the signals are directed through to the head 13*a* to record the first data item (data-word-group) sensed from the tape 2 in track 14*a* of the drum D1. During the first five revolutions of the drum D1, the head switching unit 11 is operated to feed successive data items to the heads 13*a* to 13*e* in turn, so that the first five data items sensed from the tape 2 are recorded in the tracks 14*a* to 14*e*. At the start of the sixth revolution, the AND gate 9 is closed and the AND gate 10 is opened. The signals are then fed to the head switching unit 12. During the sixth to tenth revolutions of the drum D1, the head switching unit 12 is cycled to feed the signals from the tape to the heads 15*a* to 15*e* in turn, to record the sixth to tenth data items in the tracks 16*a* to 16*e*. The complete cycle is then repeated for the eleventh to twentieth data items, and so on. Each of the storage tracks 14 and 16 is divided into sixteen sectors. Each sector is subdivided into eight sub-sectors, each of which is in turn sub-divided into five storage locations. The eight sub-sectors of each sector form two notional groups, the four sub-sectors of each such group corresponding to the code values 1, 2, 4 and 8. A digit of a data item is represented in binary code by signals recorded in the appropriate sub-sectors of one such group. An alphabetic character of a data item is represented by a digit coding in one group of sub-sectors together with zone coding signals recorded in the other group of sub-sectors. Each sub-sector contains five separate storage locations, allowing a code signal corresponding to five separate characters to be recorded in each sub-sector. The division of a storage track in this way, and the recording of characters within such a track is disclosed in copending United States patent applications, Serial Numbers 771,126, now Patent No. 3,060,414, and 771,127, now Patent No. 3,088,102, filed October 31, 1958, and is described in more detail in said copending patent applications.

The cyclic operation of the heads 13 and 15 is controlled by a counter 17 and a flip-flop 18. A track 19 of the drum D1 contains a single recorded signal which is sensed by a head 20 at the start of each revolution of the drum. The output of the head 20 is fed via an amplifier 21 to the input of the counter 17. The counter 17 counts in the scale of five and is stopped once for each revolution of the drum D1 by the signal sensed from the track 19. The counter 17 may conveniently consist of a ring of five trigger stages connected in the conventional manner to form a scale-of-five counter. A connection is made from each stage of the counter to each of the head switching units 11 and 12 as indicated schematically by line 22. Each head switching unit contains five electron tubes, each of which is rendered operative by one stage of the counter 17 to pass signals to the associated one of the heads 13 and 15. Thus, for each setting of the counter 17, one tube is operative in each of the head switching units 11 and 12. Each time the fifth stage of the counter 17 switches off, a pulse is fed to the input of the bistable flip-flop 18. This pulse is applied to both grids of the flip-flop 18 to reverse the state of the flip-flop for each pulse. For the first five revolutions of the drum D1, the flip-flop 18 is in one state and applies a control potential to the AND gate 9 to render it operative and during the next five revolutions of the drum the flip-flop 18 is in the other state and applies a control potential to the AND gate 10 to render that gate inoperative. In this way, each of the heads 13 and 15 is made operative in turn in a cyclic manner, each head being operative for one revolution of the drum D1.

It is not essential that the rotation of the tape feeding roller 5 should be synchronized with that of the drums D1 and D2. If the tape feed and the drum drive are asynchronous, the signals from the head 7 are fed to the two gates 9 and 10 through a data transfer arrangement such as that disclosed in copending United States patent application, Serial Number 848,078, filed October 22, 1959, instead of directly through the amplifier 8. The data transfer arrangement described in said last-mentioned copending patent application allows each data item to be recorded in the required position in its track, despite the asynchronous operation of the tape feed and the drum drive.

Sorting of each data item is controlled by the value of a selected group of digits of the data item. For example, sorting may be effected in relation to an information field which contains the man number, and which consists of digit positions 25 to 30 of the eighty character data item. That part of the data item which controls sorting will be referred to as the "sorting indicator." The sorting indicators for the five tracks 14*a* to 14*e* are recorded in a track 23 of the drum D1 and the sorting indicators for the five data items recorded in the tracks 16*a* to 16*e* are recorded in a track 24.

It has already been explained that each sub-sector of the tracks 14 and 16 is divided into five separate storage locations. The first storage location of each sub-sector is associated with a first timing clock pulse train, the second storage location of each sub-sector is associated with a second clock pulse train, and so on. This system of using multiple clock pulse trains is described in more detail in copending patent applications Serial Numbers 771,126 and 771,127 as aforementioned.

The five clock pulse trains are produced by signals recorded in tracks 25*a* to 25*e*, of which two only are shown in FIG. 6. The track 25*a*, which contains signals for generating the first clock pulse train, is sensed by a magnetic head 26*a* which is connected to the input of an amplifier 27*a*. The output from the amplifier 27*a* is fed to an AND gate 28*a* which is also controlled by one stage of the counter 17. Each of the other heads 26 is similarly connected through an amplifier to an AND gate which is controlled by one stage of the counter 17. In this way, the AND gates 28*a–e* are switched in a cyclic sequence by the counter 17 in a manner similar to that of the head switching units 11 and 12. Thus, the AND gate 28*a* is open during recording of data items in the tracks 14*a* and 16*a*, whereas the AND gate 28*e* is open during the recording of data items in the tracks 14*e* and 16*e*. The outputs of the AND gates 28*a–e* are combined, so that the common output line carries the first train of clock pulses during the first revolution of the drum D1, the second train of clock pulses during the second revolution of the drum D1, and so on.

The first train of clock pulses from the amplifier 27*a* is also fed to the input of a decimal counting stage 29, via a scale of four counter 40. The carry output from the counting stage 29 is fed to the input of a second decimal counting stage 30. The two counter stages 29 and 30 control the selection of those characters of each data item which form the sorting indicator. It will be assumed that numbers only are being dealt with, so that four pulse positions are allocated to represent each digit. There is one pulse from the amplifier 27*a* for each pulse position. The output from the counter 40, therefore, consists of one pulse for each digit. The value registered by the counter stages 29 and 30, at any particular time, in consequence indicates the number of digits of a data item which have been read. The counting stages 29 and 30 are each provided with ten output lines 31 and 32, respectively, only a few of the lines being shown in FIG. 6. Each counting stages energizes one of the associated group of output line at a time, the particular output line which is energized being representative of the value registered by the counter.

The selection of the group of characters which form the sorting indicator is effected by an AND gate 38 which receives the input signals from the amplifier 8 and is controlled by a flip-flop 37. The AND gate 38 is open when the flip-flop 37 is on and is closed when the flip-flop 37 is off. The flip-flop 37 is initially off and is switched on by a signal applied to one input from an AND gate 36. The flip-flop 37 may be switched off by a signal applied to the other input from an AND gate 35. Two inputs for the AND gate 36 are connected respectively to plug sockets 34*a* and 34*b*. Two inputs for the AND gate 35 are connected to plug sockets 33*a* and 33*b*, respectively. The plug sockets 33 and 34 are selectively connected to the output lines 31 of the counter stages 29 and 30 by plug wires 39. These plugged connections determine the particular character positions which are selected as the sorting indicator. The connections to the sockets 34*a,b* determine the first character of the group forming the sorting indicator and the connections to the sockets 33*a,b* determine the last character of the group.

The connections to the sockets 34*a* and 34*b* may be made, for example, from the "2" value and "4" value output lines, respectively, of the counter stages 30 and 29. The plug connections to socket 34*a* will apply one energizing voltage to the AND gate 36 as long as the tens counter stage 30 is registering the value "2." The AND gate 36 will receive a second energizing voltage via the plug connection to socket 34*b* when the units counter stage 29 switches from registering "3" to registering "4." The application of the two voltages together will cause the AND gate 36 to apply an operating signal to the flip-flop 37 to switch it on. The flip-flop 37 output voltage then holds open the gate 38 to allow the signals from the amplifier 8 to be fed to one input of a retiming flip-flop 41.

It has already been explained that the sorting indicator is recorded in a different one of the groups of storage locations for each of five revolutions of the drum D1. On the other hand, the signals from the amplifier 8 occur at a constant timing relative to the drum D1. It will be assumed that the timing of these signals corresponds to that of the first clock pulse train. Thus, the flip-flop 41 serves to store each signal temporarily to allow it to be read out at the required clock pulse timing. The flip-flop 41 is switched on each time a signal corresponding to the presence of a code element is passed by the AND gate 38. An AND gate 42 receives the selected clock pulse train from the common outputs of the gates 28*a–e* and also receives a control voltage from one anode of the flip-flop 41. The AND gate 42 provides an output pulse each time a clock pulse occurs when the flip-flop 41 is on. The output of the AND gate 42 is fed back to the other input of the flip-flop 41 to switch it off. Thus, the gate 42 passes one clock pulse each time the flip-flop 41 is switched on by a code element signal from the amplifier 8, the output signal being at the correct clock pulse timing to record in the desired storage location.

The output from the AND gate 42 is fed in common to the inputs of the AND gates 43 and 44, each of which also receives one output from the flip-flop 18. The state of the flip-flop 18 changes after every five revolutions of the drum D1. Consequently, during the first, third, fifth, etc. group of five revolutions, the AND gate 43 passes the signals from the gate 42 to a recording head 45 which is aligned with the sorting indicator track 23. During the second, fourth, etc. group of five revolutions, the AND gate 44 passes the signals to a recording head 46 which is aligned with the sorting indicator track 24. In this way, the sorting indicators for the first five items are recorded in track 23, the sorting indicators for the next five items are recorded in track 24, the sorting indicators for the next five items are recorded in track 23, and so on for each succeeding group of five items. The recording of an indicator in a particular group of storage locations automatically erases any information previously recorded in that group of locations.

The AND gate 35 is operated in the same way as the AND gate 36 to apply a pulse to the flip-flop 37 to switch it off after the last character of the sorting indicator of each item has been read. The input of an amplifier 47 is connected to the "8" value output line of the counter stage 30 and said amplifier therefore produces an output pulse when the stage reaches this value. The output pulse is applied to the stage to reset it to zero ready for the entry of the next item of information.

During the fifth and subsequent revolutions of the drum D1, the sorting indicators are read from one of the sorting indicator tracks to a comparing circuit 50. The comparing circuit controls transfer of the items from the tracks 14 and 16 to tracks on the drum D2 in order of magnitude for each group of five items.

A line 51 is energized by the counter 17 each time the counter registers the value "4." The line 51 is connected to one input of a flip-flop 52 and to the common inputs of a flip-flop 53. The first time that the line 51 is energized, the flip-flop 52 is switched on, and it remains on during the whole of the sorting operation. The flip-flop 53 is also switched on and applies an operating voltage to an AND gate 54. The AND gate 54 receives signals sensed by magnetic head 48 from the sorting indicator track 23, via an amplifier 55. Thus, during the fifth revolution of the drum D1, the sorting indicators of the first five items will be read from the track 23 to the comparing circuit 50. The position of the heads 45 and 48 on the track 23 is such that each code element of the sorting indicator for the fifth item is read by the head 48 shortly after it has been recorded by the head 45.

The comparing circuit 50 operates under control of clock pulses which are fed to it via AND gates 56*a* to 56*e* and AND gate 57. The AND gate 57 is held closed until the start of the fifth revolution by the flip-flop 52. When the flip-flop 52 is switched, the gate 57 is opened and all five trains of clock pulses pass to the comparing circuit. Thus, during the fifth revolution, the comparing circuit 50 receives the five sorting indicators for the first five times, as they are read by the head 48, and the corresponding trains of the clock pulses. The comparing circuit 50 compares the five sorting indicators and sets one of five flip-flops 58*a* to 58*e* to indicate which of the five sorting indicators is the lowest.

The flip-flop 53 will be switched again at the start of the tenth revolution of the drum D1, under the control of the counter 17. The flip-flop 53 then closes the AND gate 54 and opens an AND gate 60. This allows signals sensed by a head 49 from the other sorting indicator track 24 to be fed to the comparing circuit 50, via amplifier 59 and AND gate 60. The flip-flop 53 is switched every fifth revolution, so that the comparing circuit 50 is fed alternately from the two sorting indicator tracks.

The flip-flops 58*a* to 58*e* are reset by each end of revolution pulse from the amplifier 21. One of the flip-flops 58*a–e* will have been set by the comparing circuit 50 and this flip-flop, in resetting, generates a pulse to set corresponding ones of two groups of flip-flops 61*a* to 61*e* and 62*a* to 62*e*. Thus, if the sorting indicator of the item recorded in the track 13*a* is the least, then the flip-flop 58*a* will be set by the end of the fifth revolution and, in resetting, it will set flip-flops 61*a* and 62*a*.

An output from each of the flip-flops 61*a* to 61*e* is applied to each of two head switches 65 and 66. These head switches are similar to the switches 11 ond 12 and the inputs of the switches 65 and 66 are connected to the two groups of heads 13 and 15. The flip-flops 61 control the switches 65 and 66 in the same manner as the counter 17 controls the switches 11 and 12, except that the flip-flops 61 are operated in a sequence determined by that in which the flip-flops 58*a–e* are set by the comparing circuit 50.

With the flip-flop 61*a* set, the head switch 65 passes signals from the head 13*a* to an amplifier 67. The output of the amplifier 67 is fed to an AND gate 68 which is held open by an output from the flip-flop 18. The output from the AND gate 63 is fed via a track selection unit 69 to a head 70*a* which records in a track 71*a* of the drum D2. Thus during the sixth revolution of the drum D1, the item recorded in track 14*a* of the drum D1 is read and recorded in the first item position of the track 71*a* of the drum D2.

The head switch 66 is set by the flip-flop 61*a* to pass signals from the head 15*a*, which is used for recording at that time. The signals controlling recording are passed by the head switch 66 to an amplifier 72, which feeds an AND gate 73. The AND gate 73 is closed by an output from the flip-flop 18. Only one of the AND gates 68 and 73 is open at a time. When the AND gate 73 is operative, it feeds a track selection unit 74, which in turn feeds recording heads 75*a* to 75*e*. These heads record in tracks 76*a* to 76*e*, respectively, of the drum D2.

The track selection units 69 and 74 are not shown in detail since they are similar to the arrangement used for selecting tracks 14 and 16 on the drum D1.

The flip-flop 62*a*, when set, closes the gate 56*a* through which the first train of clock pulses are fed to the comparing circuit 50. Hence, the comparing circuit 50 receives clock pulses of the other four trains only during the sixth revolution of the drum D1, so that it is not operated by the sorting indicator signals occurring at the first clock pulse time. The comparing circuit 50 therefore sets that one of the flip-flops 58*a–e* which corresponds to the lowest of the remaining four sorting indicators. The end of revolution pulse occurring at the end of the sixth revolution sets one of each of the two groups of flip-flops 61*a–e* and 62*a–e* accordingly. For example, if the flip-flop 58*e* is set, then it will be reset, and will set flip-flop 61*e* and 62*e*. The end of revolution pulse also resets the flip-flop 61*a*.

The setting of the flip-flop 61*e* will allow the item recorded in track 14*e* of the drum D1 to be read and recorded in the second item position of track 71*a* of the drum D2. The manner in which this is done will be apparent from the description of the recording of the first item. The flip-flop 62*e* closes the gate 56*e* to cut off the supply of the fifth train of clock pulses to the comparing circuit 50. Thus, only the sorting indicators for the second, third and fourth items are compared during the seventh revolution of the drum D1.

The remaining items are recorded in order of magnitude of the sorting indicators in the track 71*a* during the following revolutions. The signals from the AND gate 68 are also fed to a sorting indicator selector 77 which operates a recording head 78 to record in a track 79 of the drum D2. The sorting indicator selector 77 is not shown in detail, since the circuit is similar to that used for selecting the sorting indicator for recording in the track 23 of the drum D1. Thus, the five items from the tracks 14, together with their sorting indicators, are recorded on the drum D2. At the same time, the sixth to tenth items are being recorded from the input tape to tracks 16 and the sorting indicator track 24 of the drum D1.

Since several processes may be taking place concurrently, it is believed that a simple numerical example may be helpful in understanding the operation of the sorting arrangement as so far described. A two digit sorting indicator may be assumed and is shown in brackets after the item. It will be realized that any number of digits may be used as the sorting indicator, without increasing the sorting time.

| Revs. of D1 | Input from tape to D1 | Transfer to D2 | Comparing circuit |
|---|---|---|---|
| 1 | Item 1 (09) to track 14*a* | ---------- | |
| 2 | Item 2 (12) to track 14*b* | ---------- | |
| 3 | Item 3 (02) to track 14*c* | ---------- | |
| 4 | Item 4 (02) to track 14*d* | ---------- | |
| 5 | Item 5 (07) to track 14*e* | ---------- | Select item 4. |
| | | (Track 71*a*) | |
| 6 | Item 6 (01) to track 16*a* | Item 4 | Select item 3. |
| 7 | Item 7 (10) to track 16*b* | Item 3 | Select item 5. |
| 8 | Item 8 (03) to track 16*c* | Item 5 | Select item 1. |
| 9 | Item 9 (06) to track 16*d* | Item 1 | Select item 2. |
| 10 | Item 10 (05) to track 16*e* | Item 2 | Select item 6. |
| | | (Track 76*a*) | |
| 11 | Item 11 (23) to track 14*a* | Item 6 | Select item 8. |

The table above shows that at the end of eleven revolutions, the first five items from the input tape have been assembled in order of the sorting indicators in track 71*a* of the drum D2.

The assembly of the second group of five items has started in track 76*a* of the drum D2. It will be seen that the comparing circuit 50 selects for transfer the item in the higher numbered track when two tracks have the same sorting indicator.

The signals from the input tape are switched alternately between the two groups of five heads each of the drum D1 and the comparing circuit 50 is similarly switched between the associated sorting indicator tracks. Thus, the input tape may run continuously.

The result of the sorting process so far is to produce groups of five items, each group recorded on one track of drum D2. The items within each group are arranged in ascending sequence. These groups are now collated to form larger groups.

The collating of the items from the two tracks of the drum D2 is carried out by a comparing unit 80, a read unit 81 and a track selection unit 82. The selection unit 82 feeds ten recording heads 83*a* to 83*j* which record in tracks 84*a* to 84*j* of the drum D1. It is believed that it is unnecessary to describe either the circuits or the operation in detail since it is entirely analogous to the transfer of the items from the drum D1 to the drum D2, except in so far as the items on each of the tracks 71*a* and 76*a* are in sequence and the comparing unit 80 has to compare only two sorting indicators at a time.

The items within each group of five are in sequence, hence the comparing unit 80 merely has to determine from which track of the pair the next item should be read. In the example given above, track 71*a* of the drum D2 will contain items arranged in the order (02), (02), (07), (09), (12), and track 76*a* will contain items arranged in the order (01), (03), (05), (06), (10). The transfer from the drum D2 to the drum D1 can commence as soon as recording has been completed in the two tracks of D2. The comparing unit 80 will select the transfer to take place to track 84*a* from track 76*a* of D2, to transfer the item with the sorting indicator (01). The next two transfers to transfer tracks 84*b* and 84*c* will be from track 71*a* of D2, to transfer the two items with sorting indicators (02). The next transfer is from track 76*a* of D2, and so on, until all ten items have been transferred.

The recording of the items on the drum D2 takes two revolutions, one for each track. The transfer to the transfer tracks can be completed within two revolutions by providing five reading heads spaced at one item intervals on each track. This allows immediate access to any item by selection of the appropriate reading head. Thus, the items may be transferred in succession irrespective of the particular order of selection as between the two tracks. Two pairs of tracks on the drum D2 are sufficient, each pair alternately receiving items from the drum D1 and transferring items to the drum D1.

Alternatively, as indicated in FIG. 6, a larger number of pairs of tracks may be provided on the drum D2, the items being transferred to the pairs of tracks in succession, thus allowing a considerable number of revolutions to occur between repeated transfers to the same pair of tracks and increasing the time available for transfer from the tracks.

Another set of ten transfer tracks on the drum D1 allows another group of ten items to be merged in the manner already described. These two groups of ten items each may then be transferred back to another group of tracks on the drum D2, being collated into a twenty item group in transfer in a manner similar to that already described. A number of these twenty item groups may be collated by another transfer from the drum D2 to the output tape.

It will be appreciated that more than two groups may be merged at each transfer. It may be convenient to provide another magnetic drum wth tracks which hold, for example, fifty items each. The transfers of groups of this size and larger then take place between drum D2 and the additional drum, rather than between the drums D1 and D2. The initial groups of items may also be made larger if desired.

The sorting process described above has two advantages over conventional methods. Firstly, as soon as the sorting of the first groups of items has been completed, these groups can be collated, the collation taking place concurrently with the sorting of other groups. Together with the fact that sorting takes place only once, instead of character by character, the sorting followed by collating requires very much less time than conventional methods. Secondly, the conventional method theoretically requires storage for ten times the number of items to be sorted since all the items might have the same digit in a particular character position, so that the storage for each digit must be equal to the number of items. A more normal distribution would be assumed in practice, with a consequent reduction in storage. However, the sort and collate process can be carried out with a storage capacity approximating twice the number of items forming the final group on the output tape.

It will be apparent that a considerable number of storage tracks are required if the sorted output groups are large. Only a proportion of these tracks are utilized at any one time and it may be convenient to replace conventional track selection arrangements by selective mechanical movement of the heads in the manner described in British specification No. 827,163. This application also describes the construction of a storage arrangement using several magnetic drums, together with logical circuits for use therewith, which is suitable for use in carrying out the invention.

It will be appreciated that magnetic discs, loops of magnetic tape and other forms of cyclic storage may be utilized in place of the magnetic drum stores which have been described.

I claim:

1. An arrangement for the sorting of a plurality of data-word-groups recorded in random sequence on input record means, each of said data-word-groups having a sorting-word which is coordinated therewith, comprising, in combination, $n$ record means, where $n$ is a number at least 2; first transfer means for transferring the data-word-groups recorded on said input record means to said $n$ record means in a manner whereby the 1st, $(n+1)^{th}$, $(2n+1)^{th}$, $(3n+1)^{th}$, etc. data-word-groups recorded on said input record means are transferred to a first of said $n$ record means, the 2nd, $(n+2)^{th}$, $(2n+2)^{th}$, $(3n+2)^{th}$, etc. data-word-groups recorded on said input record means are transferred to a second of said $n$ record means and the $n^{th}$, $(2n)^{th}$, $(3n)^{th}$, $(4n)^{th}$, etc. data-word-groups recorded on said input record means are transferred to the $n^{th}$ of said $n$ record means; comparing means for comparing in a number of steps the sorting-words coordinated with said data-word-groups to produce a comparison result indicating the smallest value of said sorting-words; second transfer means for transferring the data-word-groups coordinated with the selected sorting-words to a record means in a determined order of succession of said selected sorting-words for a group-length corresponding to the number of data-word-groups recorded on said input record means, said group-length having $n^a$ data-word-groups therein, where $n$ is the number of said $n$ record means and $a$ is the number of the comparing step; moving means for advancing one of said $n$ record means data-word-group by data-word-group recorded thereon during each comparing step until the group-length on said one of said record means has been transferred therefrom; and control means controlling said moving means in accordance with a predetermined combination of transfers of data-word-groups of said transfer means determined by said comparing of said sorting-words, the group-length of said data-word-groups at each of said transfers being increased at each of said comparing steps to $n^a$ data-word-groups.

2. An arrangement for the sorting of a plurality of data-word-groups recorded in random sequence on input record means, each of said data-word-groups having a sorting-word which is coordinated therewith, comprising, in combination, $n$ record means, where $n$ is a number at least 2; first transfer means for transferring the data-word-groups recorded on said input record means to said $n$ record means in a manner whereby the 1st, $(n+1)^{th}$, $(2n+1)^{th}$, $(3n+1)^{th}$, etc. data-word-groups recorded on said input record means are transferred to a first of said $n$ record means, the 2nd, $(n+2)^{th}$, $(2n+2)^{th}$, $(3n+2)^{th}$, etc. data-word-groups recorded on said input record means are transferred to a second of said $n$ record means and the $n^{th}$, $(2n)^{th}$, $(3n)^{th}$, $(4n)^{th}$, etc. data-word-groups recorded on said input record means are transferred to the $n^{th}$ of said $n$ record means; comparing means for comparing in a number of steps the sorting-words coordinated with said data-word-groups, the first of said comparing steps comprising comparing in succession the first sorting-word of each of said $n$ record means in a first cycle, the second sorting-word of each of said $n$ record means in a second cycle, etc.; to produce a comparison result indicating the smallest value of said sorting-words; second transfer means for transferring the data-word-groups coordinated with the selected sorting-words to a record means in a determined order of succession of said selected sorting-words for a group-length corresponding to the number of data-word-groups recorded on said input record means, said group-length having $n^a$ data-word-groups therein, where $n$ is the number of said $n$ record means and $a$ is the number of the comparing step; moving means for advancing each of said $n$ record means data-word-group by data-word-group recorded thereon from which a data-word-group is transferred during each comparing step until the group-length on each said record means has been transferred therefrom; control means for stopping the advancing of each of said $n$ record means at the end of each group-length in each of said comparing steps until the corresponding group-lengths of the others of said $n$ record means have been transferred, said control means permitting the continuation of the advancing of said $n$ record means after the completion of a cycle of a comparing step, in which the corresponding group-lengths of each of said $n$ record means have been transferred, and the initiation of the next succeeding cycle of said last-mentioned comparing step; and group-length determining means for increasing upon the completion of all the cycles of each of said comparing steps at the completion of the last cycle of said comparing step the number of data-word-groups in the group-length to a group-length of $n^a$ data-word-groups.

3. An arrangement for the sorting of a plurality of data-word-groups recorded in random sequence on input record means, each of said data-word-groups having a sorting word which is coordinated therewith, comprising, in combination, first store means for storing a plurality of data-word-groups; transfer means for transferring data-word-groups from said input record means to a selected sequence of storage positions in said first store means; second store means for storing a plurality of data-word-groups; comparing means for comparing the sorting-words of at least two of the data-word-groups stored in said first store means; transfer means operable under the control of said comparing means for transferring data-word-groups stored in said first store means to a selected sequence of storage positions in said second store means to form a larger group of data-word-groups in said second store means than that in said first store means; third store means for storing a plurality of data-word-groups; and transfer means for transferring data-word-groups stored in said second store means to a selected sequence of storage positions in said third store means to form a single group in ordered sequence of the data-word-groups of at least two of the groups of data-word-groups of said second store means.

4. A data rearranging arrangement comprising, in combination, a plurality of information channels;

input storage means for storing data information groups from said information channels, each of said data information groups including at least one indicator word;

intermediate storage means for storing a plurality of data information groups;

transfer means for transferring in one transfer cycle a predetermined number of information groups from said input storage means to said intermediate storage means, a transfer cycle being the transfer time for a number of information groups;

selecting means for selecting from said data information groups stored by said intermediate storage means groups of characters representing said indicator words;

comparing means for comparing selected groups of characters representing indicator words from selected ones of said information channels in a predetermined order to produce a comparison result;

output storage means;

transfer means for transferring in one transfer cycle a predetermined number of information groups from said intermediate storage means to said output storage means; and control means for determining the sequence in which the information groups are transferred from said intermediate storage means to said output storage means in accordance with the order indicated by said comparison result.

5. A data rearranging arrangement comprising, in combination, a plurality of information channels;

input storage means for storing data information groups from said information channels, each of said data information groups including at least one indicator word, said input storage means comprising sensing means and magnetic record carrier means moving stepwise in operative proximity with said sensing means in a manner whereby one step of movement positions in one transfer cycle a number of information groups recorded on said record carrier means in operative proximity with said sensing means, a transfer cycle being the transfer time for a number of information groups;

intermediate storage means for storing a plurality of data information groups;

transfer means for transferring in one cycle of operation a predetermined number of information groups from said input storage means to said intermediate storage means;

selecting means for selecting from said data information groups stored by said intermediate storage means groups of characters representing said indicator words;

comparing means for comparing selected groups of characters representing indicator words from selected ones of said information channels in a predetermined order to produce a comparison result;

output storage means;

transfer means for transferring in one transfer cycle a predetermined number of information groups from said intermediate storage means to said output storage means; and control means or determining the sequence in which the information groups are transferred from said intermediate storage means to said output storage means in accordance with the order indicated by said comparison result.

6. A data rearranging arangement comprising, in combination, a plurality of information channels;

input storage means for storing data information groups from said information channels, each of said data information groups including at least one indicator word;

intermediate storage means for storing a plurality of data information groups;

transfer means for transferring in one transfer cycle a predetermined number of information groups from said input storage means to said intermediate storage means, a transfer cycle being the transfer time for a number of information groups;

selecting means for selecting from said data information groups stored by said intermediate storage means groups of characters representing said indicator words;

comparing means for comparing selected groups of characters representing indicator words from selected ones of said information channels in a predetermined order to produce a comparison result;

output storage means comprising sensing means and magnetic record carrier means moving stepwise in operative proximity with said sensing means in a manner whereby one step of movement positions in one transfer cycle said record carrier means in operative proximity with said sensing means for recording a number of information groups on the said record carrier means;

transfer means for transferring in one transfer cycle a predetermined number of information groups from said intermediate storage means to said output storage means; and control means or determining the sequence in which the information groups are transferred from said intermediate storage means to said output storage means in accordance with the order indicated by said comparison result.

7. A data rearranging arrangement comprising, in combination, a plurality of information channels;

input storage means for storing data information groups from said information channels, each of said data information groups including at least one indicator word, said input storage means comprising continuously moving magnetic rotating storage means having a plurality of tracks thereon and a plurality of sensing heads positioned in operative proximity with said rotating storage means in a manner whereby each of said tracks has at least one of said heads positioned in operative proximity therewith;

intermediate storage means for storing a plurality of data information groups;

transfer means for transferring in one transfer cycle a predetermined number of information groups from said input storage means to said intermediate storage means, a transfer cycle being the transfer time for a number of information groups, said transfer means including electrical switching means for making selected ones of the sensing heads of said input storage means effective for transfer of information groups during one transfer cycle;

selecting means for selecting from said data information groups stored by said intermediate storage means groups of characters representing said indicator words;

comparing means for comparing selected groups of characters representing indicator words from selected ones of said information channels in a predetermined order to produce a comparison result;

output storage means;

transfer means for transferring in one transfer cycle a predetermined number of information groups from said intermediate storage means to said output storage means; and control means for determining the sequence in which the information groups are transferred from said intermediate storage means to said output storage means in accordance with the order indicated by said comparison result.

8. A data rearranging arrangement comprising, in combination, a plurality of information channels;

input storage means for storing data information groups from said information channels, each of said data information groups including at least one indicator word, said input storage means comprising continuously moving magnetic rotating storage means having a plurality of tracks thereon and a sensing head positioned in operative proximity with said rotating storage means;

intermediate storage means for storing a plurality of data information groups;

transfer means for transferring in one transfer cycle a predetermined number of information groups from said input storage means to said intermediate storage means, a transfer cycle being the transfer time for a number of information groups, said transfer means including mechanical moving means mechanically coupled to said sensing head for moving said sensing head from operative proximity with one of said tracks to operative proximity with another of said tracks upon the completion of a transfer cycle;

selecting means for selecting from said data information groups stored by said intermediate storage means groups of characters representing said indicator words;

comparing means for comparing selected groups of characters representing indicator words from selected ones of said information channels in a predetermined order to produce a comparison result;

output storage means;

transfer means for transferring in one transfer cycle a predetermined number of information groups from said intermediate storage means to said output storage means; and control means for determining the sequence in which the information groups are transferred from said intermediate storage means to said output storage means in accordance with the order indicated by said comparison result.

9. A data rearranging arrangement comprising in combination, a plurality of $n$ information channels, where $n$ is a number at least 3;

storage means for storing data information groups from said information channels, each of said data information groups including at least one indicator word;

selecting means for selecting from said data information groups stored by said storage means groups of characters representing said indicator words;

comparing means for comparing in a plurality of subcycles selected groups of characters representing indicator words from selected ones of said information channels in a predetermined order in a manner whereby said comparing means produces a sequence of comparison results each of which comparison results is utilized in the next succeeding sub-cycle to produce the next succeeding comparison result, a sub-cycle being less than the cycle for the transfer of a number of information groups;

output storage means;

transfer means for transferring information groups from said information channels to said output storage means; and control means for determining the sequence in which the information groups are transferred from said information channels to said output storage means in accordance with the order indicated by said comparison results.

10. A data rearranging arrangement comprising, in combination, a plurality of $n$ information channels, where $n$ is a number at least 3;

storage means for storing data information groups from said information channels, each of said data information groups including at least one indicator word;

selecting means for selecting from said data information groups stored by said storage means groups of characters representing said indicator words;

comparing means for comparing in a plurality of subcycles selected groups of characters representing indicator words from selected ones of said information channels in a predetermined order in a manner whereby said comparing means produces a sequence of comparison results each of which comparison results is utilized in the next succeeding sub-cycle to produce the next succeeding comparison result, said comparing means including masking means utilizing said comparison result to mask out the indicator word which is not to be compared in the next succeeding sub-cycle and prevent said last-mentioned indicator word from being compared in subsequent subcycles, a sub-cycle being less than the cycle for the transfer of a number of information groups;

output storage means;

transfer means for transferring information groups from said information channels to said output storage means; and control means for determining the sequence in which the information groups are transferred from said information channels to said output storage means in accordance with the order indicated by said comparison results.

11. A data rearranging arrangement comprising, in combination, a plurality of $n$ information channels, where $n$ is a number at least 3;

storage means for storing data information groups from said information channels, each of said data information groups including at least one indicator word;

selecting means for selecting from said data information groups stored by said storage means groups of characters representing said indicator words;

comparing means for comparing in a plurality of subcycles selected groups of characters representing indicator words from selected ones of said information channels in a predetermined order in a manner whereby said comparing means produces a sequence of comparison results each of which comparison results is utilized in the next succeeding sub-cycle to produce the next succeeding comparison result, a subcycle being less than the cycle for the transfer of a number of information groups, each of said comparison sub-cycles comprising the comparing of two indicator words and the comparison result being compared with a third indicator word in the next succeeding sub-cycle;

output storage means;

transfer means for transferring information groups from said information channels to said output storage means; and control means for determining the sequence in which the information groups are transferred from said information channels to said output storage means in accordance with the order indicated by said comparison results.

12. A data rearranging arrangement comprising, in combination, a plurality of *n* information channels, where *n* is a number at least 3;

storage means for storing data information groups from said information channels, each of said data information groups including at least one indicator word;

selecting means for selecting from said data information groups stored by said storage means groups of characters representing said indicator words;

comparing means for comparing in a plurality of sub-cycles selected groups of characters representing indicator words from selected ones of said information channels in a predetermined order in a manner whereby said comparing means produces a sequence of comparison results each of which comparison results is utilized in the next succeeding sub-cycle to produce the next succeeding comparison result, a sub-cycle being less than the cycle for the transfer of a number of information groups, each of said comparison sub-cycles comprising the comparing of two indicator words and the lower of said two indicator words being compared with a third indicator word in the next succeeding sub-cycle in order to determine the lowest of *n* indicator words in the entire cycle of operations;

output storage means;

transfer means for transferring information groups from said information channels to said output storage means; and control means for determining the sequence in which the information groups are transferred from said information channels to said output storage means in accordance with the order indicated by said comparison results.

13. A data rearranging arrangement comprising, in combination, a plurality of *n* information channels, where *n* is a number at least 3;

storage means for storing data information groups from said information channels, each of said data information groups including at least one indicator word;

selecting means for selecting from said data information groups stored by said storage means groups of characters representing said indicator words;

comparing means for comparing in a plurality of sub-cycles selected groups of characters representing indicator words from selected ones of said information channels in a predetermined order in a manner whereby said comparing means produces a sequence of comparison results each of which comparison results is utilized in the next succeeding sub-cycle to produce the next succeeding comparison result, a sub-cycle being less than the cycle for the transfer of a number of information groups;

output storage means;

transfer means for transferring information groups from said information channels to said output storage means; and control means for determining the sequence in which the information groups are transferred from said information channels to said output storage means in accordance with the order indicated by said comparison results, said control means including setting means for setting said control means a number of times in a cycle of operations in a sequence pattern so that in one cycle of operations a group of *n* information channels is transferred in sequence.

14. A data rearranging arrangement comprising, in combination, a plurality of storage means;

a plurality of *n* information channels, where *n* is a number at least 3, from which selected groups of data informations are stored in first selected storage areas, each of said data information groups including at least one indicator word;

selecting means for selecting from said data information groups stored in said first selected storage areas groups of characters representing said indicator words and for storing the selected indicator words in second selected storage areas different from said first storage areas;

comparing means for comparing selected groups of characters representing indicator words from selected ones of said information channels in a predetermined order to produce a comparison result;

output storage means;

transfer means for transferring information groups from said first storage areas to said output storage means; and control means for determining the sequence in which the information groups are transferred from said first storage areas to said output storage means in accordance with the order indicated by said comparison result.

15. A data rearranging arrangement comprising, in combination, a plurality of storage areas;

a plurality of *n* information channels, where *n* is a number at least 3, from which selected groups of data informations are stored in first selected information storage areas, each of said data information groups including at least one indicator word;

selecting means for selecting from said data information groups stored in said first selected storage areas groups of characters representing said indicator words and for storing the selected indicator words in second selected indicator word storage areas different from said information storage areas;

comparing means for comparing in a plurality of sub-cycles selected groups of characters representing indicator words from selected ones of said information channels in a predetermined order in a manner whereby said comparing means produces a sequence of comparison results each of which comparison results is utilized in the next succeeding sub-cycle to produce the next succeeding comparison result, a sub-cycle being less than the cycle for the transfer of a number of information groups;

output storage means;

transfer means for transferring information groups from said information storage areas to said output storage means; and control means for determining the sequence in which the information groups are transferred from said information storage areas to said output storage means in accordance with the order indicated by said comparison results.

16. A data rearranging arrangement comprising, in combination, a plurality of storage areas;

a plurality of *n* information channels, where *n* is a number at least 3, from which selected groups of data information are stored in first selected information storage areas, each of said data information groups including at least one indicator word;

selecting means for selecting from said data information groups stored in said first selected storage areas groups of characters representing said indicator words and for storing the selected indicator words in second selected indicator word storage areas different from said information storage areas;

comparing means for comparing in a plurality of sub-cycles selected groups of characters representing indicator words from selected ones of said information channels in a predetermined order in a manner whereby said comparing means produces a sequence of comparison results each of which comparison results is utilized in the next succeeding sub-cycle to produce the next succeeding comparison result, said comparing means including masking means utilizing said comparison result to mask out the indicator word which is not to be compared in the next succeeding sub-cycle and prevent said last-mentioned indicator word from being compared in subsequent sub-cycles, a sub-cycle being less than the cycle for the transfer of a number of information groups;

output storage means;

transfer means for transferring information groups from said information storage areas to said output storage means; and control means for determining the sequence in which the information groups are transferred from said information storage areas to said output storage means in accordance with the order indicated by said comparison results.

17. A data rearranging arrangement comprising, in combination, a plurality of storage areas;

a plurality of $n$ information channels, where $n$ is a number at least 3, from which selected groups of data information are stored in first selected information storage areas, each of said data information groups including at least one indicator word;

selecting means for selecting from said data information groups stored in said first selected storage areas groups of characters representing said indicator words and for storing the selected indicator words in second selected indicator word storage areas different from said information storage areas;

comparing means for comparing in a plurality of sub-cycles selected groups of characters representing indicator words from selected ones of said information channels in a predetermined order in a manner whereby said comparing means produces a sequence of comparison results each of which comparison results is utilized in the next succeeding sub-cycle to produce the next succeeding comparison result, a sub-cycle being less than the cycle for the transfer of a number of information groups, each of said comparison sub-cycles comprising the comparing of two indicator words and the comparison result being compared with a third indicator word in the next succeeding sub-cycle;

output storage means;

transfer means for transferring information groups from said information storage areas to said output storage means; and control means for determining the sequence in which the information groups are transferred from said information storage areas to said output storage means in accordance with the order indicated by said comparison results.

18. A data rearranging arrangement comprising, in combination, a plurality of storage areas;

a plurality of $n$ information channels, where $n$ is a number at least 3, from which selected groups of data informations are stored in first selected information storage areas, each of said data information groups including at least one indicator word;

selecting means for selecting from said data information groups stored in said first selected storage areas groups of characters representing said indicator words and for storing the selected indicator words in second selected indicator word storage areas different from said information storage areas;

comparing means for comparing in a plurality of sub-cycles selected groups of characters representing indicator words from selected ones of said information channels in a predetermined order in a manner whereby said comparing means produces a sequence of comparison results each of which comparison results is utilized in the next succeeding sub-cycle to produce the next succeeding comparison result, a sub-cycle being less than the cycle for the transfer of a number of information groups, each of said comparison sub-cycles comprising the comparing of two indicator words and the lower of said two indicator words being compared with a third indicator word in the next succeeding sub-cycle in order to determine the lowest of $n$ indicator words in the entire cycle of operations;

output storage means;

transfer means for transferring information groups from said information storage areas to said output storage means; and control means for determining the sequence in which the information groups are transferred from said information storage areas to said output storage means in accordance with the order indicated by said comparison results.

19. A data rearranging arrangement comprising, in combination, a plurality of storage areas;

a plurality of $n$ information channels, where $n$ is a number at least 3, from which selected groups of data informations are stored in first selected information storage areas, each of said data information groups including at least one indicator word;

selecting means for selecting from said data information groups stored in said first selected storage areas groups of characters representing said indicator words and for storing the selected indicator words in second selected indicator word storage areas different from said information storage areas;

comparing means for comparing in a plurality of sub-cycles selected groups of characters representing indicator words from selected ones of said information channels in a predetermined order in a manner whereby said comparing means produces a sequence of comparison results each of which comparison results is utilized in the next succeeding sub-cycle to produce the next succeeding comparison result, a sub-cycle being less than the cycle for the transfer of a number of information groups;

output storage means;

transfer means for transferring information groups from said information storage areas to said output storage means; and control means for determining the sequence in which the information groups are transferred from said information storage areas to said output storage means in accordance with the order indicated by said comparison results, said control means including setting means for setting said control means a number of times in a cycle of operations in a sequence pattern so that in one cycle of operations a group of $n$ information channels is transferred in sequence.

20. A data rearranging arrangement comprising, in combination, a plurality of continuously moving magnetic rotating storage areas in synchronism with each other;

a plurality of $n$ information channels, where $n$ is a number at least 3, from which selected groups of data information are stored in first selected storage areas, each of said data information groups including at least one indicator word;

selecting means for selecting from said data information groups stored in said first selected storage areas groups of characters representing said indicator words and for storing the selected indicator words in second selected storage areas different from said first storage areas;

comparing means for comparing selected groups of characters representing indicator words from selected ones of said information channels in a predetermined order to produce a comparison result;

output storage means;

transfer means for transferring information groups from said first storage areas to said output storage means; and control means for determining the sequence in which the information groups are transferred from said first storage areas to said output storage means in accordance with the order indicated by said comparison result.

21. A data rearranging arrangement comprising, in combination, a plurality of continuously moving magnetic rotating storage areas in synchronism with each other;

a plurality of *n* information channels, where *n* is a number at least 3, from which selected groups of data informations are stored in first selected storage areas, each of said data information groups including at least one indicator word;

selecting means for selecting from said data information groups stored in said first selected storage areas groups of characters representing said indicator words and for storing the selected indicator words in second selected storage areas different from said first storage areas;

comparing means for comparing selected groups of characters representing indicator words from selected ones of said information channels in a predetermined order to produce a comparison result;

output storage means;

transfer means for transferring information groups from said first storage areas to said output storage means and for transferring information groups in either direction between different ones of said plurality of storage areas; and control means for determining the sequence in which the information groups are transferred from said first storage areas to said output storage means in accordance with the order indicated by said comparison result.

22. A data rearranging arrangement comprising, in combination, a plurality of continuously moving magnetic rotating storage areas in synchronism with each other, a number of said rotating storage areas moving at different speeds of rotation from the others;

a plurality of *n* information channels, where *n* is a number at least 3, from which selected groups of data informations are stored in first selected storage areas, each of said data information groups including at least one indicator word;

selecting means for selecting from said data information groups stored in said first selected storage means groups of characters representing said indicator words and for storing the selected indicator words in second selected storage areas different from said first storage areas;

comparing means for comparing selected groups of characters representing indicator words from selected ones of said information channels in a predetermined order to produce a comparison result;

output storage means;

transfer means for transferring information groups from said first storage areas to said output storage means; and control means for determining the sequence in which the information groups are transferred from said first storage areas to said output storage means in accordance with the order indicated by said comparison result.

23. A data rearranging arrangement comprising, in combination, a plurality of continuously moving magnetic rotating storage areas in synchronism with each other, said rotating storage areas comprising a plurality of tracks and a plurality of parallel sensing heads positioned in operative proximity with said tracks in a manner whereby each of said tracks has at least one of said heads positioned in operative proximity therewith;

a plurality of *n* information channels, where *n* is a number at least 3, from which selected groups of data informations are stored in first selected storage areas, each of said data information groups including at least one indicator word;

selecting means for selecting from said data information groups stored in said first selected storage areas groups of characters representing said indicator words and for storing the selected indicator words in second selected storage areas different from said first storage areas;

comparing means for comparing selected groups of characters representing indicator words from selected ones of said information channels in a predetermined order to produce a comparison result;

output storage means;

transfer means for transferring information groups from said first storage areas to said output storage means, said transfer means including switching means for making selected ones of the sensing heads of said rotating storage areas effective for transfer of information groups; and control means for determining the sequence in which the information groups are transferred from said first storage areas to said output storage means in accordance with the order indicated by said comparison result.

References Cited by the Examiner

UNITED STATES PATENTS

| | | | |
|---|---|---|---|
| 2,901,732 | 8/1959 | Canning | 340—172.5 |
| 2,907,003 | 9/1959 | Hobbs | 340—172.5 |
| 2,935,732 | 5/1960 | Guerber | 340—172.5 |
| 2,985,864 | 5/1961 | Fillebrown et al. | 340—172.5 |
| 3,017,610 | 1/1962 | Auerbach et al. | 340—174.1 |

ROBERT C. BAILEY, *Primary Examiner.*

EVERETT R. REYNOLDS, DARYL W. COOK, MALCOLM A. MORRISON, *Examiners.*